US011751030B2

(12) United States Patent
Haverlag et al.

(10) Patent No.: US 11,751,030 B2
(45) Date of Patent: Sep. 5, 2023

(54) TRIGGER-BASED COMMISSIONING SYSTEM

(71) Applicant: SIGNIFY HOLDING B.V., Eindhoven (NL)

(72) Inventors: Marco Haverlag, Mierlo (NL); Rene Van Honschooten, Nuenen (NL); Francisco Jose Estevez, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/774,001

(22) PCT Filed: Oct. 27, 2020

(86) PCT No.: PCT/EP2020/080180
§ 371 (c)(1),
(2) Date: May 3, 2022

(87) PCT Pub. No.: WO2021/089368
PCT Pub. Date: May 14, 2021

(65) Prior Publication Data
US 2022/0400361 A1   Dec. 15, 2022

(30) Foreign Application Priority Data
Nov. 4, 2019 (EP) ..................... 19206901

(51) Int. Cl.
*H04W 4/50* (2018.01)
*H04W 4/80* (2018.01)
*H04L 61/5038* (2022.01)
*H04W 84/18* (2009.01)

(52) U.S. Cl.
CPC ........... *H04W 4/50* (2018.02); *H04L 61/5038* (2022.05); *H04W 4/80* (2018.02); *H04W 84/18* (2013.01)

(58) Field of Classification Search
CPC ........ H04W 4/50; H04W 4/80; H04L 61/5038
See application file for complete search history.

(56) References Cited

U.S. PATENT DOCUMENTS

| 2016/0127875 A1* | 5/2016 | Zampini, II | G01S 5/0226 370/311 |
| 2016/0142263 A1* | 5/2016 | Erdmann | H04W 8/005 455/41.2 |
| 2017/0041886 A1* | 2/2017 | Baker | H04W 52/0245 |

(Continued)

*Primary Examiner* — David Bilodeau

(57) ABSTRACT

To improve the accuracy of a trigger-based commissioning in a high dense network without leveraging an optical link, a separate beacon tag (400) is employed to assist the commissioning procedure between a node (200) and a commissioning device (300). A trigger event is detected at the node (200) side when its local identification number is equal to the identification number comprised in a second type of beacon received from the beacon tag (400), and the proximity of the beacon tag (400) is determined to be below a local threshold. Upon the detection of such a trigger event, the node (200) updates its first type of beacons to notify the commissioning device 300 about the trigger event. And then, the commissioning device (300) confirms the trigger event and sends a request for commissioning to the node (200).

14 Claims, 3 Drawing Sheets

(56) References Cited

U.S. PATENT DOCUMENTS

| | | | |
|---|---|---|---|
| 2018/0027635 A1* | 1/2018 | Roquemore, III | ........................... H04W 52/0229 315/307 |
| 2018/0176760 A1 | 6/2018 | Brandt | |
| 2018/0248760 A1* | 8/2018 | Deixler | .................. H05B 47/29 |
| 2018/0351759 A1 | 12/2018 | Kishimoto et al. | |
| 2019/0007548 A1* | 1/2019 | Sit | ........................... H04W 4/80 |
| 2019/0036722 A1 | 1/2019 | Singamsetty et al. | |
| 2019/0190741 A1 | 6/2019 | Wendt | |
| 2020/0288558 A1* | 9/2020 | Anderson | ............. H04W 8/005 |
| 2020/0374692 A1* | 11/2020 | Bamidi | ................. H04L 9/3242 |
| 2021/0051538 A1* | 2/2021 | Huang | .............. H04W 36/0011 |
| 2021/0274363 A1* | 9/2021 | Zhang | .................... H04W 4/70 |

* cited by examiner

TRIGGER-BASED COMMISSIONING SYSTEM

CROSS-REFERENCE TO PRIOR APPLICATIONS

This application is the U.S. National Phase application under 35 U.S.C. § 371 of International Application No. PCT/EP2020/080180, filed on Oct. 27, 2020, which claims the benefit of European Patent Application No. 19206901.1, filed on Nov. 4, 2019. These applications are hereby incorporated by reference herein.

FIELD OF THE INVENTION

The invention relates to the field of commissioning in wireless communication networks. More particularly, various methods, apparatus, systems and computer-readable media are disclosed herein related to controlling the commissioning of a node out of a plurality of nodes to a wireless network by a commissioning device in a trigger-based commissioning approach.

BACKGROUND OF THE INVENTION

There is an ongoing trend in the professional lighting market to move more and more towards connected lighting systems, which enable all kinds of new features like (remote) scheduling, energy monitoring, sensor-based lighting control and asset management. In many cases these systems are installed in existing buildings, in which cases a wireless network is preferred to avoid having to deploy new cables (for lighting control) through the ceiling. Examples of such wireless network protocols which are used widely in current practice are open standards like Zigbee, Thread, BLE, BLE mesh, Wi-Fi, Wi-Fi direct, and various proprietary network implementations built on top of the IEEE 802.15.4, IEEE 802.15.1 or IEEE 802.11 standards. Before these systems can be used in practice the various wireless nodes that constitute the network must be configured.

The most common method to accomplish this is to have one wireless device (in most cases a gateway or bridge) open a wireless network and have the factory new wireless nodes automatically join this network by a process called auto-joining. After the network has been formed in this way the commissioning engineer can identify each fixture one-by-one by sending blink commands to each device and register each device to its location or group. Since in this process there is no relation identified on the distance from the commissioning device to the fixtures, the node will typically appear in a random way, which mean that quite some time is spent in locating the devices.

Given the drawbacks of auto-joining, in an alternative way of working the system does not let the devices join automatically, but only after a trigger has been given by the commissioning device. In this method the commissioning device does a local scan and orders the devices to join in order of proximity to an individual device. The proximity information is typically obtained by measuring a received radio strength from a signal from a certain device. When there are a large number of devices deployed in a relatively small area, signals from different devices may conflict to each other, and the received radio strength may not be always accurate enough to distinguish a relatively small difference on distances between the commissioning device and several devices.

A pointing-assisted commissioning method is then proposed to have further improvement on the performance. The pointing-assisted commissioning method has the advantage that a commissioning engineer has full control over individual devices to be added to the network and the exact order in commissioning such devices. The pointing mechanism is usually built on top of an optical link by leveraging a line-of-sight feature of the optical communication. However, such a method requires the device to have an additional optical sensor to detect the optical trigger from the commissioning device, which adds up to the cost of the device. Furthermore, a direct line-of-sight channel between the commissioning device and the device imposes additional limitation on the application scenario.

D1 (US 2018027635 A1) discloses that a lighting control device remains in a low power mode and is awakened for commissioning by a triggered signal. In response to the trigger signal, the lighting control device transmits a packet to connect to a commissioning device, and then receives a commissioning message from the commissioning device after transmitting the packet to the commissioning device.

D2 (US2018176760 A1) relates to a method for wireless non-line-of-sight commissioning of smart devices. Smart devices can broadcast a first radio message that is detected by an ID tool during commissioning. The first radio messages can be unique to each device, such that the ID tool can send a second radio message addressed to a select device, the address based on the first radio message from the select/addressed device. The addressed device can respond to confirm the identity and location of the addressed device. The ID tool can then send a third radio message with a registration request command, again addressed to the selected installed device. In response, the selected installed device can enter a registration request mode and transmit an identification to a commissioning system, whereby that device's identity is now know to the system and can be wirelessly controlled.

D3 (US2019036722 A1) relates to a system of intelligent lights together with control devices and sensors communicating over a wireless network, with methods to allow the lights to take actions based on logical combinations of events generated by other devices. The lights can function autonomously as they have built-in functions of logic processing, storage and wireless communications which allow them to receive events and take actions according to the stored logic configuration data.

SUMMARY OF THE INVENTION

In view of the above, the present disclosure is directed to methods, apparatus, systems, computer program and computer-readable media for providing a mechanism related to an improved trigger-based commissioning, to achieve a similar effect as a pointing-based commissioning without the need of an optical link. More particularly, the goal of this invention is achieved by a node as claimed in claim 1, by a commissioning device as claimed in claim 8, by a system as claimed in claim 11, by a method as claimed in claims 12 and 13 for the node and the commissioning device respectively, and by a computer program as claimed in claim 14.

Accordingly, in order to trigger an individual node with sufficient accuracy, a beacon tag is to be placed in close proximity to the node. A unique identification number will be comprised in the beacons sent by the beacon tag. The node will detect a trigger event if such kind of beacons from the beacon tag are detected with the identification number equal to a local identification number, and the beacon tag is determined to be sufficiently close to the node. Then the node will update its own beacon by including an indication of the detection of the trigger event. By placing the beacon tag to a certain node and detecting the updated beacon from the node afterwards via a commissioning device, a commissioning engineer has a better control of the trigger-based commissioning.

In accordance with a first aspect of the invention a node is provided. A node out of a plurality of nodes for assisting a trigger-based commissioning of the node to a network using a first wireless communication protocol by a commissioning device, the node comprising: a first receiver configured to detect signals via a second wireless communication protocol; a controller configured to detect a trigger event. The trigger event is detected when a second type of beacon is detected by the first receiver from a beacon tag; the second type of beacon comprises an identification number, and the identification number is equal to a local identification number known by the controller; and a proximity between the beacon tag and the node, derived from the second type of beacon, is determined to be below a local threshold. Upon the detection of a trigger event, a first transmitter is configured to update a first type of beacons by inserting an indication of the trigger event in the first type of beacons; and send the updated first type of beacons via the second wireless communication protocol. The first receiver is further configured to detect a request for commissioning from the commissioning device via the second wireless communication protocol to start commissioning of the node, following sending of the updated first type of beacons by the first transmitter.

The node can be any factory new device to be commissioned to a wireless network. In a lighting context, the node may for example be a lighting device, a luminaire, a sensor, or a switch. In a broader home automation context, the node may also be comprised in a HVAC system, a smart refrigerator, a smart oven, other smart white goods, or a remote controller.

The task of configuring devices and networks to achieve the needs of the specific installation is known as commissioning. Thus, commissioning encompasses a wide range of tasks, including a survey of the radio and physical environment, the admission of a device to a network, configuration of parameters, application binding, optimization of network and device parameters, and testing and verification of correct operation. The present invention is mainly intended to assist a commissioning device and a node to setup of a one-to-one connection in a more deterministic manner. And hence, the follow-up commissioning can be carried out more effectively and efficiently. In a broader perspective, the invention may also be used in applications where a larger number of installed wireless devices need to be maintained or diagnosed in a one-to-one manner.

The first type of beacons is used by the node to advertise itself and to invite the commissioning device for commissioning. However, in the trigger-based commissioning, it is necessary that the node is triggered first before it can be commissioned. Before the detection of a trigger event, the first transmitter may send the first type of beacons at a certain beacon rate, which is preferred to be set to a very low frequency. Considering the plurality of nodes may be deployed in high density, a low beacon rate is beneficial to reduce mutual interference among the plurality of nodes and to reduce the power consumption of the node. In a preferred scenario, the beacon rate is set to 0 Hz, which means the first transmitter does not send the first type of beacon before the trigger event. Furthermore, if the node is not full duplex, a low beacon rate or no beacon transmission before the trigger event also allows the node to have more time to monitor the channel to detect the second type of beacons from a beacon tag, in order to get triggered.

Before the detection of a trigger event, the first receiver is configured to detect signals via the second wireless communication protocols. The first receiver may receive first type of beacons from other nodes in the surroundings, advertisement from a commissioning device, or a second type of beacons from a beacon tag. The controller thus filters irrelevant signals to detect a valid trigger event.

A valid trigger event is detected when the three conditions are fulfilled. First, a second type of beacons is detected from a beacon tag. Second, an identification number comprised in the second type of beacon is equal to a local identification number known by the node. Third, the proximity between the beacon tag and the node also satisfies certain requirement, which means the beacon tag should be sufficiently close to the node.

To identify the identification number in the second type of beacon, it is beneficial to construct the identification number in a predefined format, which is a fixed format known by the node. The local identification number of the node may be a predefined identification number, which may be configured in a factory pre-set. It may also be configured during the physical installation of the node in the field. The identification number may be used to indicate a certain application group, a user group, a hierarchy level, or a classification type. It may happen that there are multiple commissioning devices used by different commissioning engineers in the same area for carrying out different tasks. By detecting that the local identification number is identical to the identification number received from a beacon tag, the node may be alert about a potential trigger event and start to check if the proximity between the beacon tag and the node is below a local threshold, indicating a close proximity between the beacon tag and the node.

The local threshold for proximity assessment can be either predetermined in the same manner as the local identification number. It may also be received by the node from the commissioning device via advertisements or beacons from the commissioning device. The local threshold is used to define which level of proximity is considered to be sufficient to reach the similar effect of a pointing-based approach without using an optical link. Therefore, the setting may depend on the deployment density of the plurality of nodes, or the required accuracy on triggering, or the reliability on the proximity assessment. Therefore, it is desirable that the local threshold is configured in the field, such as by the commissioning device.

In another example, the node may not have a local threshold, and then a "basic" trigger event is confirmed by satisfying only the first two criteria, such as when the second type of beacon is received from a beacon tag and the identification number comprised in the second type of beacon is equal to the local identification number, regardless of the proximity between the beacon tag and the node. Consequently, the node needs to include the proximity information in the updated first type of beacons upon the detection of the so-called "basic" trigger event. And hence, the commissioning device may have to judge if the proximity information obtained based on the updated first type of beacons from the node is considered to indicate a sufficient proximity between the node and the beacon tag.

When the commissioning device receives the updated first type of beacon with the indication of the trigger event, a request for commissioning will be send to the node to start commissioning of the node. The request may include configuration information related to the one-to-one connection between the node and the commissioning device, or the configuration information related to the settings to get accessed to the network.

When the commissioning device receives the updated first type of beacon with the indication of the "basic" trigger event and the proximity information, the commissioning device will send the request for commissioning to the node after a positive assessment on the proximity information.

To avoid unnecessary collisions between signals to be detected and the first type of beacons, it is preferable that the first transmitter is configured to transmit only when the first receiver is not detecting. This is also the case when the node does not support full-duplex communication.

Preferably, the first wireless communication protocol is different from the second wireless communication protocol. And then the communication via the second wireless communication protocol for setting up the one-to-one connection will not affect the data communication via the first wireless communication protocol for the nodes that are already connected to the network. Whereas the second wireless communication protocol is mainly for a point-to-point connection or a star topology, the network using the first wireless communication protocol may adopt a star topology, a tree topology, a mesh topology, or a hybrid of different topologies.

Advantageously, the proximity is derived based on a propagation characteristic of the second type of beacon.

The proximity or distance can be derived according to a propagation characteristic of electromagnetic waves, such as the time of flight or path attenuation principle. The propagation characteristic can be at least one of: time of flight, a received signal strength indicator, RSSI, and a link quality indicator, LQI. To get a relatively accurate estimation of proximity, a moving average calculation is typically adopted to filter out certain variation on the channel, such as small-scale fading. And then the proximity indicator can represent more accurately the propagation characteristic of the second type of beacons detected by the node from the beacon tag.

Preferably, LQI or RSSI can be used as the parameter to identify the proximity, as LQI or RSSI measurements are already adopted by many wireless communication protocols and supported by the radio chips.

Note that a close proximity is determined here by having a proximity or distance below a certain threshold, which are usually derived from LQI or RSSI measurement results being above another threshold, given that a high received signal strength typically indicating a short distance or close proximity. However, the translation between the two kinds of information may differ in a practical system depending on the definition of those parameters.

In one embodiment, the local identification number is obtained by the controller based on a second identification number received from the commissioning device by means of a third type of beacon detected by the first receiver from the commissioning device via the second communication protocol.

As disclosed above, the local identification number may be a predefined identification number. Advantageously, the local identification number may also be obtained by the node from the commissioning device at an earlier stage. In this manner, there is no need to have a factory pre-set on the local identification number in the node, which provides more freedom in manufacturing. Furthermore, there is no requirement on pairing a beacon tag and a group of nodes with regard to the identical identification code, which improves the system flexibility.

In another example, if a node receives such an identification number from a commissioning device, the received identification number may overwrite the original factory pre-set identification number permanently or for a certain time duration allowing for the completion of a typical commissioning procedure. Similarly, a new identification number received from a new commissioning device may overwrite an old identification number received earlier from another commissioning device.

Preferably, the commissioning device may also include the threshold information in the third type of beacons, together with the identification number. And hence, the node registers both the identification number and threshold information received in the third type of beacon as local identification number and local threshold. By adjusting the threshold information to a certain application scenario, the commissioning device may have better control on the trigger-based commissioning.

Preferably, the indication of the trigger event is at least one of: a binary indicator indicating the detection of the trigger event, the determined proximity information between the node and the beacon tag, or a combination of the binary indicator and the determined proximity information.

After the node detects a trigger event, it is important to inform the commissioning device about this. Therefore, the node will update the first type of beacons by including the indication of the trigger event. Depending on whether the trigger event detected is a normal trigger event fulfilling three criteria or a "basic" trigger event fulfilling only two out of the three criteria, as disclosed above, the node may come up with different indications. In case of a normal trigger event, the indication may simply be a binary indicator. In case of the "basic" trigger event, the indication may be the determined proximity information, or a combination of the binary indicator and the determined proximity information.

In one embodiment, the second wireless communication protocol is in accordance with a Bluetooth Low Energy, BLE, standard.

Beneficially, BLE beacons are used to measure the proximity information and to set up the one-to-one connection between the commissioning device and the node. The first type of beacons sent by the node may be connectable BLE beacons, while the third type of beacons sent by the commissioning device may be non-connectable BLE beacons.

Advantageously, the second type of beacon sent by the beacon tag is an iBeacon. An iBeacon is a special kind of BLE advertisement following a strict format being a prefix, a variable UIUD, and a major, minor pair. UIUD is typically used to identify the device or the beacon tag, which can be specified in terms of the manufacturer, application, or owner. Thus, UIUD can be used to identify a beacon tag from all the other iBeacon tags, or other BLE devices. The major, minor pair may be used to represent the unique identification number of the present invention.

In another example, the beacon tag is following an Eddystone profile. And hence, the second type of beacon may be an Eddystone-UUID frame, and the identification number can be the combination of Namespace and Instance. It may also be that the second type of beacon comprises an Eddystone-TLM frame with a unique identification number of the beacon tag.

In a preferred setup, the first wireless communication protocol is in accordance with a Zigbee standard.

Zigbee standard is widely adopted in home automation and lighting control applications. The Zigbee network layer natively supports both star and tree networks, and generic mesh networking. The powerful topology control provides it great flexibility in a control system. However, the initial set up of the network, and especially the commissioning of a large number of nodes to the network in an orderly manner, can be troublesome, as addressed before. With the new BLE and Zigbee combo node, it is beneficial to make use of the easy setup of point-to-point connections in a BLE system to facilitate the commissioning of nodes to a Zigbee network. Operating the two procedures, commissioning and data communication, with two different wireless communication protocols further improves the efficiency of the system.

In one embodiment, the first transmitter is further configured to send the first type of beacons at an initial beacon rate via the second wireless communication protocol before the detection of the trigger event by the controller.

Since the first type of beacons from the node without indicating the detection of a trigger event are typically ignored by the commissioning device, the initial beacon rate is preferred to be set to a very low frequency, or even 0 Hz.

Advantageously, the first transmitter is further configured to send the updated first type of beacons with an increased beacon rate as compared to the initial beacon rate, following the detection of the trigger event by the controller.

In a typical application scenario, a commissioning engineer may hold both the commissioning device and the beacon tag, although the commissioning device may be a smart phone or a standalone remote controller and the beacon tag may be attached to a separate extension pole, or long stick type of device. Therefore, when a trigger event is detected by the node, the commissioning device shall also be close to the node. It is more efficient for the node to increase the beacon rate on sending the first type of beacon upon the detection of the trigger event, and the increased beacon rate helps boost the chance that those beacons will be received by the commissioning device. In this manner, the beacon rate of a node may be controlled adaptively to further facilitate the trigger-based commissioning procedure.

In accordance with a second aspect of the invention a commissioning device is provided. When pairing between a beacon tag and a plurality of nodes is already implemented during manufacturing or during installation, the commissioning device may start a commissioning procedure for a node right away upon a trigger event is detected by the node. Otherwise, the commissioning device carries out extra steps to help the beacon tag to build up the pairing with the plurality of nodes, before it can start the commissioning procedure.

For carrying out a trigger-based commissioning of a node, out of a plurality of nodes, to a network using a first wireless communication protocol, the commissioning device comprises: a second receiver configured to detect a first type of beacon from the node out of the plurality of nodes via the second wireless communication protocol; a controller configured to determine if the received first type of beacon from the node comprises an indication of a detection of a trigger event of the node; a second transmitter configured to send a request for commissioning to the node via the second wireless communication protocol, following confirmation of receipt of the first type of beacon with an indication of a detection of a trigger event by the controller.

The commissioning device is configured to detect the event of a node getting triggered, by receiving the first type of beacons comprising an indication of the detection of a trigger event. And then, the commissioning device may send a request to that node to start the commissioning procedure. The commissioning engineer may make use of a separate beacon tag to approach a single node each time. And the commissioning device will detect the change of the first type of beacon of that node and send the request for commissioning accordingly. Hence, the trigger-based commissioning may be carried out in a better-controlled manner, similar to a pointing-based commissioning.

The request from the commissioning device may include configuration information related to the one-to-one connection between the node and the commissioning device, or the configuration information related to the settings to get accessed to the network. To take BLE as an example for the first wireless communication protocol, all the beacons and advertisements may be sent on the broadcasting channels of a BLE system. And the one-to-one connection between the commissioning device and the node may be switched to one of the data channels of the BLE system. Therefore, the request for commissioning may probably also comprise such information related to channel switching. The signalling handshakes for detailed configuration or commissioning will then take place on the new data channel.

In a preferred embodiment, the second receiver is further configured to detect a second type of beacons from a beacon tag via the second wireless communication protocol, and wherein the second type of beacons comprises an identification number; and the controller is further configured to register the identification number received from the beacon tag, when the beacon tag is determined to be closer to the commissioning device than any other beacon tag; and the second transmitter is further configured to send a third type of beacons to the plurality of nodes via the second wireless communication protocol, following the identification number being registered by the controller; and wherein the third type of beacons comprise the registered identification number.

As disclosed above, it brings great flexibility to the system when the local identification number of the node is obtained from the commissioning device, instead of a factory pre-set value. To authorize the triggering function to a selected beacon tag, the commissioning device may have an initial step to detect an identification number from the selected beacon tag and to store the identification number locally, and then the commissioning device will send broadcasting messages including the identification number to the plurality of nodes. In such a manner, a node knows about on which identification number it should react.

Considering another use case that there are multiple commissioning engineers operating in the same area for different commissioning purposes, and each of those engineers has a commissioning device and a beacon tag. Given that the selected beacon tag may be placed closest to the commissioning device of a certain commissioning engineer, a commissioning device will always register the identification number received from a beacon tag that is determined to be closer to the commissioning device than any other beacon tag. As long as the identification number belonging to the beacon tag is unique in the area, the operations among different commissioning engineers can be carried out independently and in parallel.

Advantageously, the controller of the commissioning device is further configured to determine an order of priority to commission more than one node out of the plurality of nodes according to the first type of beacons received from each one of the more than one node; and wherein the second transmitter is further configured to send a sequence of requests to the more than one node via the second wireless communication protocol, to commission each one of the more than one node sequentially according to the order determined by the controller.

With the three entities, the node, the beacon tag, and the commissioning device, the progress on triggering individual nodes and the progress on completing the commissioning procedure can be independent and asynchronous, such that a second node is already triggered before a first node gets commissioned. For example, when several nodes are co-located or placed close to each other to serve a similar function, the beacon tag may be put to that group of nodes without deliberately distinguishing one from another. Hence, it can be the case that the commissioning device receives from more than one node the first type of beacons with the indication of the detection of a trigger event. The commissioning device needs to determine an order of priority to commissioning the mode than one node, and to send out a sequence of requests for commissioning to each one of the more than one node sequentially. The priority may be determined according to the order of receiving the first type of beacons from these nodes. It may also be determined according to the possible proximity information comprised in the first type of beacons.

Alternatively, the group of nodes may have a same group identifier, and the request for commissioning may be sent to that group address in multicast, which can be used to speed up the commissioning procedure for a large network.

In accordance to a third aspect of the invention, a system is provided. A system for carrying out a trigger-based commissioning of a node, out of a plurality of nodes of the present invention, to a network using a first wireless communication protocol. The system comprises a beacon tag configured to send a second type of beacons comprising a predetermined identification number in the beacons via the second wireless communication protocol; and a node out of the plurality of nodes; and a commissioning device of the present invention.

In a preferred setup of the system, the beacon tag is attached to an extension pole, a selfie stick, a long stick or wand type of device to reach a node in close proximity more easily. For example, in a lighting application, the node may be deployed in a luminaire on the ceiling. It is much more convenient if we have a separate beacon tag attached to such an extension pole, a selfie stick, a long stick or wand type of device.

In another setup, the beacon tag may be attached to a drone or another kind of unmanned aerial vehicle (UAV). Hence, the beacon tag may still approach closely to the nodes that are out of the reach of an extension pole, a selfie stick, a long stick or wand type of device. In a lighting application, this setup can be very useful to commission lighting fixtures in a warehouse, a stadium, or at an airport.

Advantageously, the beacon tag further comprises a directional antenna with a narrow beam width. In that sense, the ambiguity related to the electromagnetic propagation characteristic in an omni-directional manner is further reduced, and a commissioner can select a node more accurately.

Preferably, the system comprises a beacon tag configured to send a second type of beacons comprising a random number in the beacons via the second wireless communication protocol, a node out of the plurality of nodes, and a commissioning device of the present invention.

Beneficially, in case that the node obtains the local identification number from the commissioning device, there is no need to have the pairing between the node and the beacon tag beforehand. The beacon tag may use a random number as the identification number in the second type of beacons. The commissioning device will then forward that random number received from a selected beacon tag to the plurality of nodes. Then the pairing is implemented on the field.

The random number may be generated with a pseudo random number generator. It need not be globally unique, but it should be locally unique.

In accordance to another aspect of the invention, a method is provided for execution by a node, out of a plurality of nodes, for assisting a trigger-based commissioning of the node to a network using a first wireless communication protocol by a commissioning device, the method comprises the node detecting signals via a second wireless communication protocol; detecting a trigger event when
  a second type of beacon detected is from a beacon tag;
  the second type of beacon comprises an identification number, and the identification number is equal to a local identification number; and
  a proximity between the beacon tag and the node, derived from the second type of beacon, is determined to be below a local threshold.

The method further comprises the steps of updating a first type of beacons by inserting an indication of the trigger event in the first type of beacons upon the detection of the trigger event; sending the updated first type of beacons via the second wireless communication protocol; and detecting a request for commissioning from the commissioning device via the second wireless communication protocol to start commissioning of the node, following sending of the updated first type of beacons.

In accordance to a further aspect of the invention, a method of a commissioning device is provided for carrying out a trigger-based commissioning of a node, out of a plurality of nodes, to a network using a first wireless communication protocol. The method comprises the commissioning device detecting a first type of beacon from the node via the second wireless communication protocol; determining if the received first type of beacon from the node comprises an indication of a detection of a trigger event of the node; sending a request for commissioning to the node via the second wireless communication protocol, following confirmation of receipt of the first type of beacon with an indication of a detection of a trigger event.

To help a beacon tag to set up the pairing with a node, out of the plurality of nodes, a preferred method comprises the commissioning device detecting a second type of beacon from a beacon tag via a second wireless communication protocol, and wherein the second type of beacon comprises an identification number; registering the identification number received from the beacon tag, when the beacon tag is determined to be closer to the commissioning device than any other beacon tag; and sending a third type of beacons to the plurality of nodes via the second wireless communication protocol, following the identification number being registered; and wherein the third type of beacons comprise the registered identification number.

The invention may further be embodied in a computer program comprising code means which, when the program is executed by a node comprising processing means or a commissioning device comprising processing means, cause the processing means to carry out any one of the methods of the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
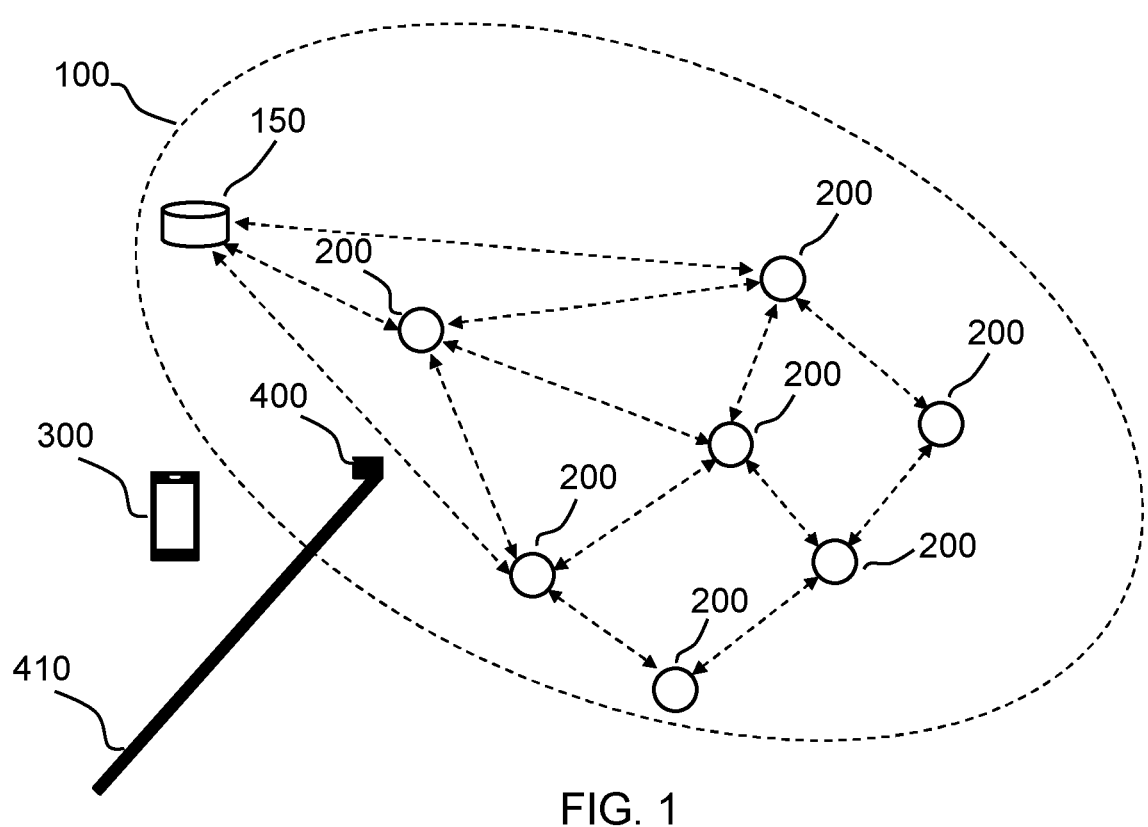
FIG. 1 demonstrates an overview of the system where a plurality of nodes are to be commissioned by a commissioning device to a network.

Various embodiments of the present invention will now be described based on a plurality of nodes 200 to be commissioned by a commissioning device 300 to a network 100 in a trigger-based commissioning, as shown in FIG. 1. The plurality of nodes 200 can be factory new devices to be commissioned to a network 100. The network can be a local network to serve a certain control purpose. The network can also be connected to the cloud or a backbone network, via 150 a gateway, a bridge, or a router device. In a lighting context, a node 200 may be comprised in a lighting device, a luminaire, a sensor, or a switch to serve for the communication function of the lighting device, the luminaire, the sensor, or the switch. A node 200 may also be comprised in a HVAC system, a smart refrigerator, a smart oven, other smart white goods, or a remote controller in a broader home automation context. The commissioning device may be a smart phone, a remote controller, or a stand-alone device with a commissioning tool function.

In a trigger-based commissioning approach, the commissioning device will commission each node in order according to a trigger event of the node. Typically, such trigger event is based on proximity between the commissioning device and the node. Considering a plurality of nodes deployed in high density, highly accurate proximity information will be crucial to the commissioning procedure. In a lighting scenario, the nodes may be deployed on the ceiling, as in luminaires, while the commissioning device may be held by a commissioning engineer in hand. Given the distance between the commissioning device and the node, to get a reliable and indubitable trigger event for an individual node becomes quite challenging.

On the other hand, a pointing-based commissioning is usually built on top of an optical link by leveraging a line-of-sight feature of the optical communication, which has the advantage that a commissioning engineer has full control over individual nodes to be added to the network and the exact order in commissioning such nodes. However, an optical sensor is needed in an individual node to detect the optical trigger from the commissioning device. The additional optical component adds up to the cost of the node, which becomes a downside of this solution. The present invention aims to achieve similar performance as a pointing-based commissioning without necessitating an optical component in the node.

To achieve this goal, the present invention proposes to make use of a separate beacon tag 400 to bridge the gap between a conventional trigger-based commissioning and an optical-pointing based commissioning. To reduce the uncertainty related to proximity estimation, it is preferred that the beacon tag 400 is attached to an extension pole, a selfie stick, a long stick or wand type of device 410. Hence, the beacon tag can be easily placed in immediate vicinity to the node 200, such as within 50 cm, or preferably within 10 cm, even if the node is deployed on the ceiling in a lighting scenario.

A trigger event is then defined for the node 200 according to the proximity of the beacon tag and an identification number received from the beacon tag is identical to a local identification number. The proximity information is derived according to the propagation characteristics of the second type of beacons detected, such as time of flight, RSSI or LQI information. To derive a reliable RSSI or LQI information, the node may implement a running average calculation of such values to get a good estimation.

Figure 2:
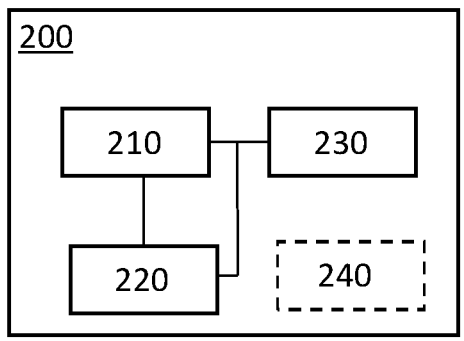
FIG. 2 schematically depicts basic components of a node.

FIG. 2 schematically depicts basic components of a node 200. A first transmitter 210 is configured to send the first type of beacons via the second wireless communication protocol. In a BLE case, the first type of beacons can be a connectable advertisement from the node. However, in a trigger-based commissioning, the commissioning device will ignore such beacons before it confirms that the node sending the first type of beacons is already triggered. A first receiver 220 is configured to detect signals via the second wireless communication protocol. The signals can be a first type of beacon from a peer node 200, a second type of beacon from a beacon tag 400, or another beacon from the commissioning device 300. A controller 230 is configured to detect a trigger event when three criteria are satisfied: the signal detected by the first receiver 220 is a second type of beacon from a beacon tag 400; an identification number comprised in the second type of beacon is equal to a local identification number; a proximity between the beacon tag 400 and the node 200 is below a local threshold.

To reduce conflict against the first type of beacons from multiple nodes in the surroundings and more importantly to reduce conflict against the second type of beacons from the beacon tag, the first transmitter is configured to first send the first type of beacons at an initial beacon rate, or equivalently at an initial beacon/advertisement interval. Preferably, the initial beacon interval may be set to 300 ms or larger, which means the initial beacon rate may be set around 3.33 Hz or lower. In an extreme case, the initial beacon rate may be set to 0 Hz, which means the node may not send out beacons at all before it detects a trigger event.

It is more preferable that the node spends most of its time monitoring the channel to detect the second type of beacons from the beacon tag, before the detection of a trigger event. Given that channel monitoring can be quite power-consuming, the first receiver is preferable to operate with an on-and-off cycle. The on period should at least cover the duration of one complete beacon from the beacon tag and the initial duty cycle applied to the first receiver is preferably higher than 10%, and even more preferable higher than 50%, in order to detect the beacons from the beacon tag promptly.

After the detection of the trigger event, it is desirable that the first transmitter sends the updated first type of beacons more frequently, at an increased beacon rate as compared to the initial beacon rate. Considering the node is ready for commissioning and the commissioning device is also in vicinity, an increased beacon rate increases the chance that the updated first type of beacons is detected by the commissioning device immediately, and hence speeds up the commissioning procedure of the node. Such adaptive control of the beacon rate of the node improves the efficiency of the node itself and also improves the overall efficiency of the system, with regard to the reduced interference and more prompt commissioning procedure.

In the updated first type of beacon, the node may simply include a binary indication as the indication of the detection of the trigger event, when the node has confirmed that the proximity between the node and the beacon tag satisfies a local threshold. The local threshold used for proximity assessment may be a predefined value, or a value obtained from the commissioning device. The node may also include the derived proximity information or a combination of the binary indicator and the proximity information as the indication of the trigger event. This may happen when the node has no local threshold available, and it can only estimate the proximity or distance between itself and the beacon tag but cannot determine if the proximity is considered sufficient to trigger commissioning. Furthermore, since more information is provided to the commissioning device in such a manner, the commissioning device has more freedom to control the commissioning procedure, so as to employ a dynamically controlled proximity threshold according to a local density of the nodes. For example, the density of the nodes in a room is observed to be higher than the previous room, and the commissioning engineer may consider tightening the threshold on proximity assessment to avoid confusion.

The first wireless communication protocol is mainly to support the control function of the plurality of nodes, such as lighting control or building automation. Preferably, the first wireless communication protocol supports a multi-hop technology, which can be Zigbee, Thread, Bluetooth Mesh, Wi-Fi mesh, WirelessHART, SmartRF, CityTouch, IP500, Z-wave, or any other mesh or tree-based technology.

It is preferred that the second wireless communication protocol is in accordance with a Bluetooth low energy, BLE, standard. It can also be Wi-Fi direct, Zigbee Touchlink, or another wireless communication standard that favours an easy setup for point-to-point connection. With the request for commissioning from the commissioning device to the node, a one-to-one connection will be set up between the node and the commissioning device. In a BLE case, the request from the commissioning device may instruct the node to switch from one of the broadcasting channels for sending and receiving beacons to a data channel for a dedicated one-to-one connection. The benefits are that there are more data channels available than the broadcasting channels, and the data channels are less interference prone.

Optionally, the node 200 may further comprise an application controller or an actuator, as indicated by 240 in FIG. 2. Such application controller or actuator is related to the control functionality of the node either in a lighting context or a broader home automation context.

Figure 3:
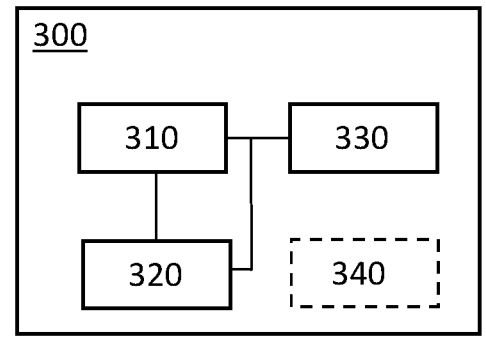
FIG. 3 schematically depicts basic components of a commissioning device.

FIG. 3 schematically depicts basic components of a commissioning device 300. A second receiver 320 is configured to detect the first type of beacons from the node via the second wireless communication protocol. Upon the detection of the beacons, a controller 330 is configured to determine if a received beacon is an updated first type of beacon from a node 200, which comprises an indication on a detection of a trigger event of the node 200. Depending on the type of indication detected in the beacon, the controller 330 may be further configured to check if the received proximity information is equal to or above a certain threshold, indicating the distance between the node and the beacon tag is considered to be sufficiently close. If yes, a second transmitter 310 is configured to send a request for commissioning to the node 200 via the second wireless communication protocol.

As aforementioned, the node may have pre-knowledge on the identification number, such pre-knowledge may be obtained during manufacturing or during installation. However, to facilitate the trigger event, pairing between the local identification number of a node and identification number comprised in the second type of beacons from the beacon tag is needed, which implies extra complexity to the system. Thus, it is preferred that the identification number may be obtained by the node from the commissioning device on the field. To authorize the triggering function to a selected beacon tag, the second receiver 320 may be further configured to detect a second type of beacons from the selected beacon tag 400, and the second type of beacons comprise an identification number.

Considering a scenario where there are multiple commissioning engineers operating in the same area for different commissioning purposes, each of those engineers has a commissioning device and a beacon tag. Given that the selected beacon tag may be placed closest to the commissioning device belonging to a certain commissioning engineer, a commissioning device will always register the identification number received from a beacon tag that is determined to be closer to the commissioning device than any other beacon tag. As long as the identification number belonging to the beacon tag is unique in the area, the operations among different commissioning engineers can be carried out independently and in parallel.

The controller 330 is further configured to register the identification number received from the selected beacon tag 400, by locally storing the identification number in a memory or a register. And the second transmitter 310 is further configured to send a third type of beacons, comprising the registered identification number, to the plurality of nodes 200 via the second wireless communication protocol. Upon receiving the third type of beacons, a node may register or update its local identification number. Advantageously, the third type of beacons may further comprise a preferred proximity threshold, indicating the proximity criterion required by the commissioning device. and hence, the node may further register or update its local threshold for proximity assessment. The third type of beacons can be an un-connectable advertisement in a BLE case.

As indicated in FIG. 3, the commissioning device may optionally comprise a user interface 340. Given that the commissioning device may be a smart phone, a remote controller, or a stand-alone device with a commissioning tool function, a user interface 340 may provide extra convenience to the commissioner in carrying out the commissioning task.

Figure 4:
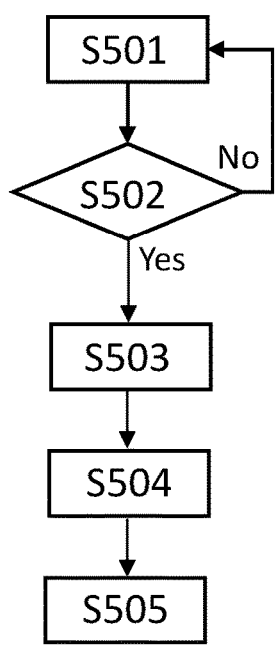
FIG. 4 shows a flow diagram of a method carried out by a node.

FIG. 4 shows a flow diagram of a method 500 carried out by a node 200. In step S501, the node 200 detects signals via a second wireless communication protocol. The signals can be the first type of beacons from other nodes 200, the second type of beacons from a beacon tag 400, or a third type of beacons from a commissioning device 300. In step S502, the nodes 200 determines if a trigger event is detected, when the following three criteria are satisfied: a second type of beacon detected is from a beacon tag 400; the second type of beacon comprises an identification number, and the identification number is equal to a local identification number; and a proximity between the beacon tag (400) and the node (200), derived from the second type of beacon, is determined to be below a local threshold. And then, in step S503, the node updates a first type of beacons by inserting an indication of the trigger event in the first type of beacons upon the detection of the trigger event. The node sends the updated first type of beacons via the second wireless communication protocol in step S504. And in step S505, the node detects a request for commissioning from the commissioning device 300 via the second wireless communication protocol to start commissioning of the node 200, following sending of the updated first type of beacons.

Figure 5:
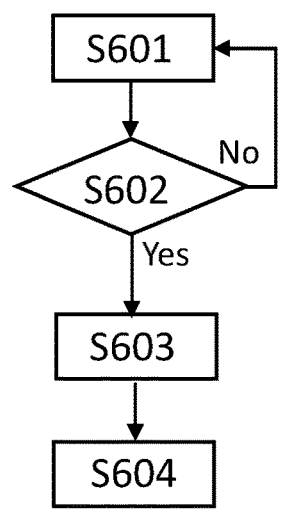
FIG. 5 shows a flow diagram of a method carried out by a commissioning device.

FIG. 5 shows a flow diagram of a method 600 carried out by a commissioning device 300. In step S601, the commissioning device 300 detects a second type of beacon from a beacon tag 400 via a second wireless communication protocol. The commissioning device 300 determines, in step S602, if the beacon tag 400 is closer to the commissioning device 300 than any other beacon tag. If yes, the commissioning device 300 registers, in step S603, the identification number received from the beacon tag 400. And then, in step S604, the commissioning device 300 sends a third type of beacons to the plurality of nodes 200 via the second wireless communication protocol, following the identification number being registered; and wherein the third type of beacons comprise the registered identification number.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer or a processing means comprised in a node or a network or a commissioning device as disclosed in the above-described embodiments.

Methods, systems and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases.

The invention claimed is:

1. A node out of a plurality of nodes for assisting a trigger-based commissioning of the node to a network using a first wireless communication protocol by a commissioning device, the node comprising:
   a receiver configured to detect signals via a second wireless communication protocol;
   a controller configured to detect a trigger event when a second type of beacon is detected by the receiver from a beacon tag;

the second type of beacon comprises an identification number, and the identification number is equal to a local identification number known by the controller,
a proximity between the beacon tag and the node, derived from the second type of beacon, is determined to be below a local threshold; and
a transmitter, configured upon the detection of the trigger event to:
update a first type of beacons by inserting an indication of the trigger event in the first type of beacons; and
send the updated first type of beacons via the second wireless communication protocol; and
wherein the receiver is further configured to:
detect a request for commissioning from the commissioning device via the second wireless communication protocol to start commissioning of the node, following sending of the updated first type of beacons by the transmitter.

2. The node of claim 1, wherein the proximity is derived based on a propagation characteristic of the second type of beacon.

3. The node of claim 1, wherein the local identification number is obtained by the controller based on a second identification number received from the commissioning device by means of a third type of beacon detected by the receiver from the commissioning device via the second communication protocol.

4. The node, wherein the indication of the trigger event is at least one of: a binary indicator indicating the detection of the trigger event, the determined proximity information between the node and the beacon tag, or a combination of the binary indicator and the determined proximity information.

5. The node of claim 1, wherein the second wireless communication protocol is in accordance with a Bluetooth Low Energy, BLE, standard.

6. The node claim 1, wherein the transmitter is further configured to send the first type of beacons at an initial beacon rate via the second wireless communication protocol before the detection of the trigger event by the controller.

7. The node of claim 6, wherein the transmitter is further configured to send the updated first type of beacons with an increased beacon rate as compared to the initial beacon rate, following the detection of the trigger event by the controller.

8. A commissioning device for carrying out a trigger-based commissioning of a node, out of a plurality of nodes, to a network using a first wireless communication protocol, the commissioning device comprising:
a receiver configured to detect a second type of beacon from a beacon tag via a second wireless communication protocol, and wherein the second type of beacon comprises an identification number;
a controller configured to register the identification number received from the beacon tag, when the beacon tag is determined to be closer to the commissioning device than any other beacon tag; and
a transmitter configured to send a third type of beacons to the plurality of nodes via the second wireless communication protocol, following the identification number being registered by the controller; and wherein the third type of beacons comprise the registered identification number.

9. The commissioning device of claim 8, wherein after the third type of beacons being sent by the transmitter, the receiver is further configured to:
to detect a first type of beacon from the node out of the plurality of nodes via a second wireless communication protocol; and the controller is further configured to:
determine if the received first type of beacon from the node comprises an indication of a detection of a trigger event of the node; and
the transmitter is further configured to;
send a request for commissioning to the node via the second wireless communication protocol, following confirmation of receipt of the first type of beacon with an indication of a detection of a trigger event by the controller.

10. The commissioning device of claim 9, wherein the controller is further configured to:
determine an order of priority to commission more than one node out of the plurality of nodes according to the first type of beacons received from each one of the more than one node; and
wherein the transmitter is further configured to:
send a sequence of requests to the more than one node via the second wireless communication protocol, to commission each one of the more than one node sequentially according to the order determined by the controller.

11. A system for carrying out a trigger-based commissioning of a node, out of a plurality of nodes of claim 3, to a network using a first wireless communication protocol, the system comprising:
a beacon tag configured to send a second type of beacons comprising a random number in the beacons via the second wireless communication protocol; and
a node out of the plurality of nodes.

12. A method implemented by a node, out of a plurality of nodes, for assisting a trigger-based commissioning of the node to a network using a first wireless communication protocol by a commissioning device, the method comprising
detecting signals via a second wireless communication protocol;
detecting a trigger event when a second type of beacon detected is from a beacon tag, wherein the second type of beacon comprises an identification number, and the identification number is equal to a local identification number;
determining a proximity between the beacon tag and the node, derived from the second type of beacon, is below a local threshold;
updating a first type of beacons by inserting an indication of the trigger event in the first type of beacons upon the detection of the trigger event;
sending the updated first type of beacons via the second wireless communication protocol; and
detecting a request for commissioning from the commissioning device via the second wireless communication protocol to start commissioning of the node, following sending of the updated first type of beacons.

13. A method implemented by a commissioning device for carrying out a trigger-based commissioning of a node, out of a plurality of nodes, to a network using a first wireless communication protocol, the method comprising:
detecting a second type of beacon from a beacon tag via a second wireless communication protocol, and wherein the second type of beacon comprises an identification number;
registering the identification number received from the beacon tag, when the beacon tag is determined to be closer to the commissioning device than any other beacon tag; and
sending a third type of beacons to the plurality of nodes via the second wireless communication protocol, following the identification number being registered; and
wherein the third type of beacons comprise the registered identification number.

14. A non-transitory computer program comprising instructions which, when the instructions are executed by a processor, cause the processor to perform the method of claim 12.

\* \* \* \* \*